(12) United States Patent
Sun

(10) Patent No.: US 7,257,006 B2
(45) Date of Patent: Aug. 14, 2007

(54) ASSEMBLING ELECTRONIC DEVICE

(76) Inventor: Liang Sun, No. 211, Huaxia Jingui Garden, Lane 1349, East Huaxia Road, Pudong, Shanghai (CN)

( * ) Notice: Subject to any disclaimer, the term of this patent is extended or adjusted under 35 U.S.C. 154(b) by 281 days.

(21) Appl. No.: 10/891,905

(22) Filed: Jul. 14, 2004

(65) Prior Publication Data

US 2005/0013122 A1     Jan. 20, 2005

(30) Foreign Application Priority Data

Jul. 18, 2003  (CN) ................................ 03 1 41684
Oct. 8, 2003   (CN) ........................ 2003 2 0108721

(51) Int. Cl.
*H05K 5/00*     (2006.01)

(52) U.S. Cl. ...................... 361/752; 361/756; 361/788; 361/683

(58) Field of Classification Search ................ 361/788, 361/756, 683–686

See application file for complete search history.

(56) References Cited

U.S. PATENT DOCUMENTS 5,331,509 A * 7/1994 Kikinis ........................ 361/686
6,098,131 A * 8/2000 Unger et al. ................. 710/303
7,110,527 B2 * 9/2006 Skradde et al. ............. 379/325

* cited by examiner

*Primary Examiner*—Tuan Dinh
*Assistant Examiner*—Hung S. Bui
(74) *Attorney, Agent, or Firm*—Raymond Y. Chan; David and Raymond Patent Group

(57) ABSTRACT

An assembling electronic device includes a plurality of functional modules, a characterized casing having a plurality of receiving cavities, and a terminal circuit. Each of said functional modules is shaped and sized to detachably receive in the respective receiving cavity so as to securely retain the functional module in the characterized casing in position. The terminal circuit is provided at the characterized casing to electrically connect with the terminals of the functional modules when the functional modules are detachably received in the receiving cavities respectively so as to form a complete circuit for the functional modules, such that each of the functional modules is replaceably mounted in the characterized casing for enhancing a user-personalizability.

3 Claims, 6 Drawing Sheets

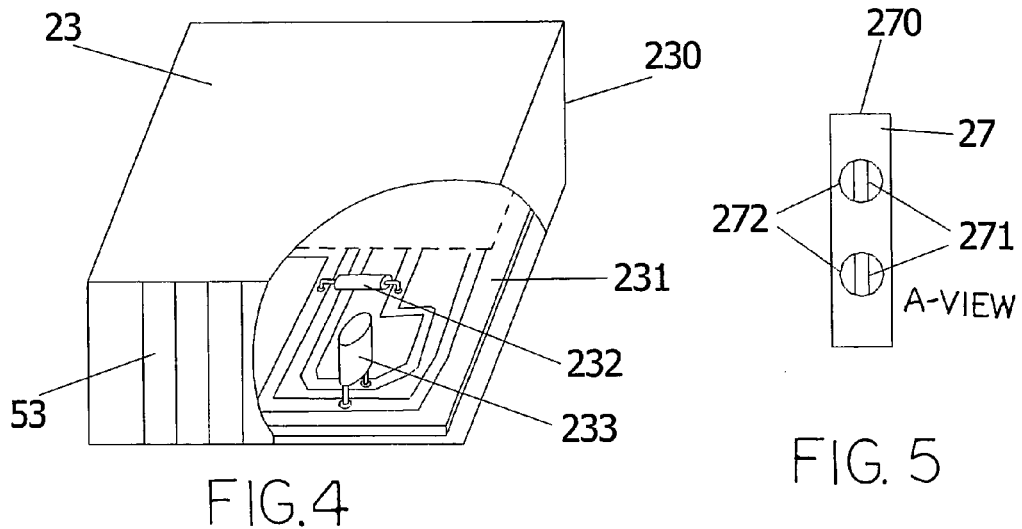
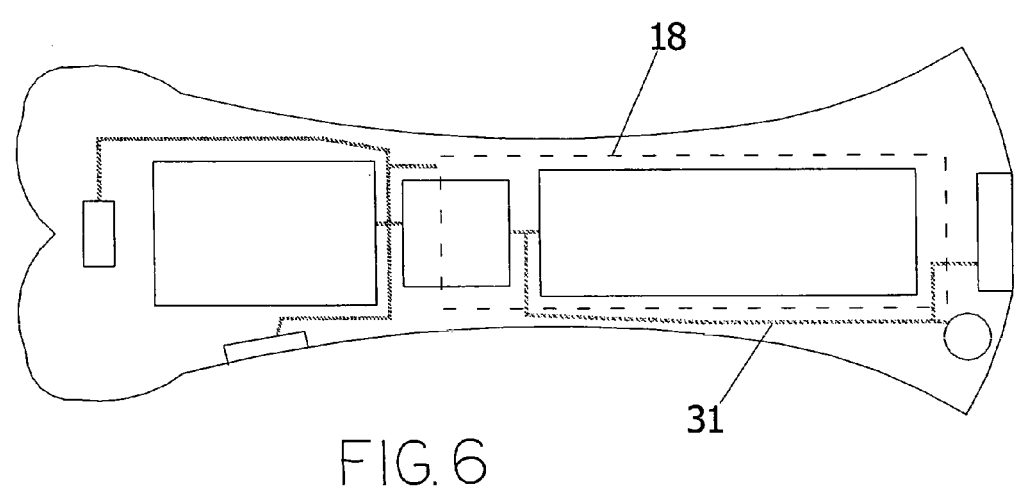

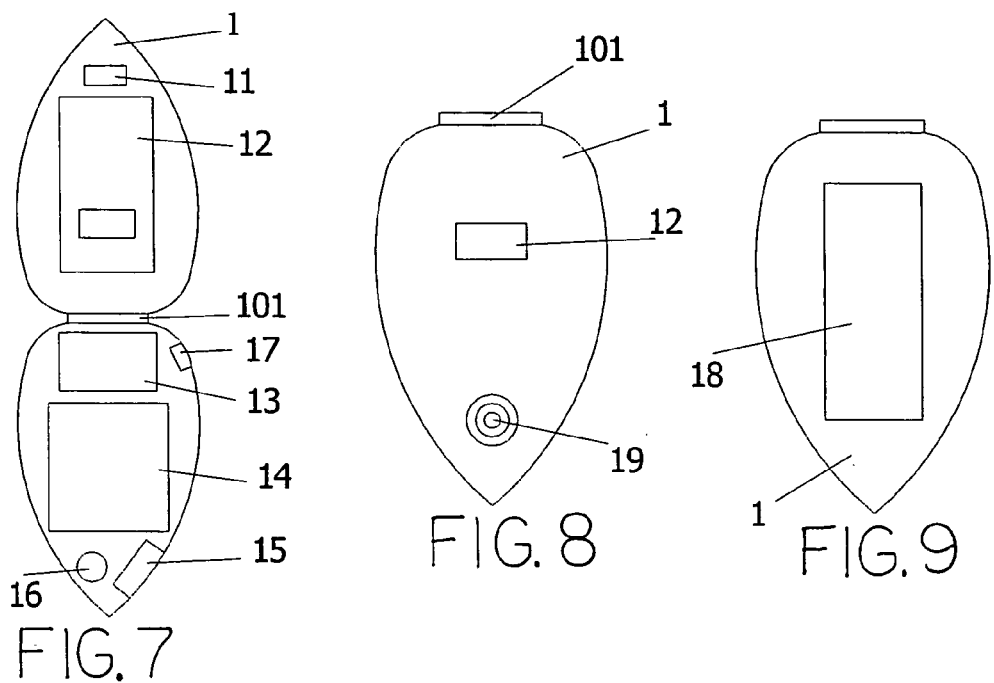
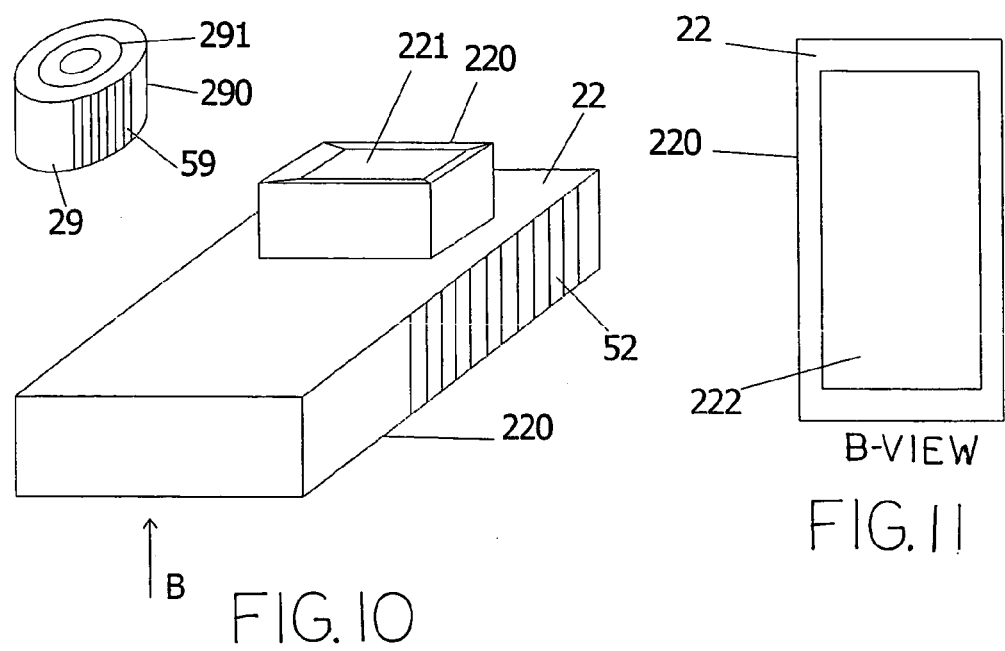

B-VIEW

ASSEMBLING ELECTRONIC DEVICE

BACKGROUND OF THE PRESENT INVENTION

1. Field of Invention

The present invention relates to an electronic device, and more particularly to a convenient portable electronic device, such as wireless mobile phones, MP3 players, digital cameras, hand-held computers, portable video game devices, portable radios, portable hard drives, mini digital recorders, PDAs, or portable devices with more than one of the functions of the above devices.

2. Description of Related Arts

Nowadays, as electronic technology advances continuously, all sorts of electronic devices that can satisfy people's daily need are developed. Conventional portable devices do not allow the user to alter their shapes, despite the fact that the casing of many wireless mobile phones are able to be changed, merely changing the color or pattern on such casings. Shapes of the mobile phone, or, in other words, the design characteristics, cannot be altered. As a result, in a world of increasing demand in personalizing the appearance of products, it is getting more and more difficult to please consumers by the unchangeable designs of electronic devices. Furthermore, up to this point in time, it is not easy or convenient to upgrade the functions of such portable devices.

Even when upgrades are available, such upgrades not only are usually limited to adding storage space, but also require the assistance of specialized maintenance personnel. And, when a partial upgrade in function or an increase in performance is desired, the user will usually have to purchase a new device, which is not economical and limited by people's economic ability.

With the advances of the world, it is apparent that there are growing expectations in readily available, quick and economic upgrades in function of their portable devices, so as to satisfy their daily needs.

Furthermore, the production process of such portable devices has to be fairly similar to existing production technologies, so as to avoid a sharp increase in production cost.

SUMMARY OF THE PRESENT INVENTION

A main object of the present invention is to provide an assembling electronic device, wherein a user can self-assemble the electronic device so as to change to shape and outlook as desired. By utilizing different shaping structure of the characterized casing and the functional modules, the user can change the shape and the appearance of the electronic device with unlimited number of times, so as to satisfy his or her desire for a personalized life. Also, the user can choose, and mix-and-match, any newest functional modules to replace the original functional modules and easily complete upgrading the functions of the electronic device. Furthermore, through the process of mixing-and-matching, changing of shape and functional upgrading, each functional module inside the electronic device receives better protection.

Furthermore, the design of such electronic devices is as simple as possible, without adding on new independent member.

Accordingly, in order to accomplish the above objects, the present invention provides an assembling electronic device, comprising:

a plurality of functional modules each having a terminal;

a characterized casing having a plurality of receiving cavities, each of the functional modules is shaped and sized to detachably receive in the respective receiving cavity so as to securely retain the functional module in the characterized casing in position; and a terminal circuit provided at the characterized casing to electrically connect with the terminals of the functional modules when the functional modules are detachably received in the receiving cavities respectively so as to form a complete circuit for the functional modules, such that each of the functional modules is replaceably mounted in the characterized casing for enhancing a user-personalizability.

These and other objectives, features, and advantages of the present invention will become apparent from the following detailed description, the accompanying drawings, and the appended claims.

BRIEF DESCRIPTION OF THE DRAWINGS

FIG. 4 is a sectional perspective view illustrating the main control module according to the above preferred embodiment of the present invention.

FIG. 5 is a side view of the auxiliary key-in module according to the above embodiment of the present invention.

FIG. 6 illustrates the terminal circuit electrically connected to the functional modules in the characterized casing to form a complete circuit according to the above embodiment of the present invention.

FIG. 7 illustrates an alternative mode of the characterized casing of the assembling electronic device according to the above preferred embodiment of the present invention, illustrating the characterized casing being folded at an opened position.

FIG. 8 illustrates the alternative mode of the characterized casing of the assembling electronic device according to the above preferred embodiment of the present invention, illustrating the display module receiving cavity and the image recorder module receiving cavity.

FIG. 9 illustrates the alternative mode of the characterized casing of the assembling electronic device according to the above second preferred embodiment of the present invention, illustrating the receiving cavity for the power supply module.

FIG. 10 illustrates the functional modules for the alternative mode of the characterized casing according to the above preferred embodiment of the present invention.

FIG. 11 is a side view illustrating the display module element for the alternative mode of the characterized casing according to the above preferred embodiment of the present invention.

DETAILED DESCRIPTION OF THE PREFERRED EMBODIMENT

Figure 1:
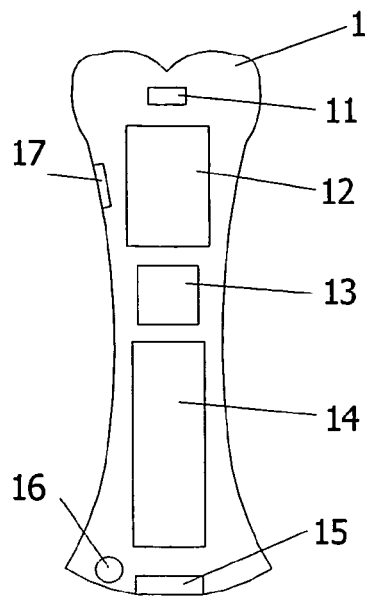
FIG. 1 is a front view of a characterized casing of an assembling electronic device according to a preferred embodiment of the present invention.
Figure 2:
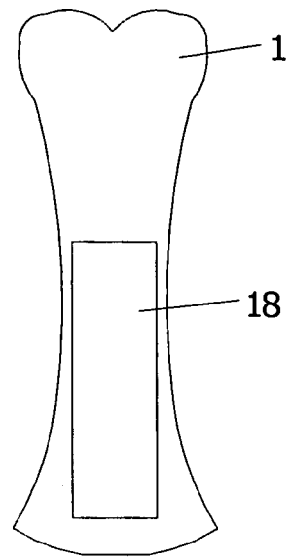
FIG. 2 is a rear view of the characterized casing of the assembling electronic device according to the above preferred embodiment of the present invention.

Referring to FIGS. 1 through 6 of the drawings, an assembling electronic device according to a first embodiment of the present invention is illustrated, wherein the assembling electronic device comprises a plurality of functional modules each having a terminal, a characterized casing 1 and a terminal circuit.

The characterized casing 1, having a shaping structure to enhance the aesthetic appearance of the electronic device, has a plurality of receiving cavities, wherein each of the functional modules is shaped and sized to detachably receive in the respective receiving cavity so as to securely retain the functional module in the characterized casing 1 in position.

The terminal circuit is provided at the characterized casing 1 to electrically connect with the terminals of the functional modules when the functional modules are detachably received in the receiving cavities respectively so as to form a complete circuit for the functional modules, such that each of the functional modules is replaceably mounted in the characterized casing 1 for enhancing a user-personalizability.

According to the embodiment, the assembling electronic device is embodied as a wireless mobile phone wherein the characterized casing 1 is embodied the phone housing while the functional modules are embodied as the individual modules of the mobile phone. Accordingly, the characterized casing 1 comprises an elongated casing body defining the receiving cavities 11-18 aligned therewithin and a corresponding detachable face, wherein the detachable face is detachably attached to the casing body to enclose the receiving cavities 11-18 such that each of the functional modules is adapted to be replaced when the detachable face is detached from the casing body. Therefore, each of the functional modules is replaceably mounted in the casing body to form the assembling electronic device.

As shown in FIGS. 1 to 6, the characterized casing 1 of the assembling electronic device is shaped and sized as a wireless mobile phone housing comprises a plurality of receiving cavities 11, 12, 13, 14, 15, 16, 17, 18, corresponding to a plurality of functional modules respectively, namely, audio frequency output module 21, display module 22, main control module 23, main key-in module 24, external port module 25, audio receiver module 26, auxiliary key-in module 27 and power supply module 28. The terminals 51, 52, 53, 54, 55, 56, 57, 58 are provided at the functional modules 21-28 respectively. Accordingly, each of the terminals 51-58 are resilient conductive terminals adapted for providing an urging force to ensure the electrical connection with the terminal circuit.

Each of the functional modules 21-28 comprises a module housing and an internal circuitry received therein, wherein the terminal 51-58 is provided at the module housing to electrically connect with the internal circuitry such that when the complete circuit is formed, the internal circuitries of the functional modules 21-28 are electrically connected with each other through the terminal circuit. As shown in FIG. 4, the main control module 23 as one of the functional modules is illustrated as an example, wherein the internal circuitry comprises the main control module 23 comprises a circuit board 231, a resistor 232 and a capacitor 233 received in the corresponding module housing 230. The respective terminal 53 is provided at the module housing 230 to electrically connect with the internal circuitry 231-233 such that when the complete circuit is formed, the internal circuitry 231-233 of the main control module 23 is electrically connected with the internal circuitries of other functional modules 21, 22, 24, 25, 26, 27, 28 through the terminal circuit. It is worth to mention that the internal circuitry of the main control module 23 comprises other necessary components (not shown in FIG. 4) while the internal circuitry only figuratively illustrated in the figure. The dashed lines on the circuit board represents others members that have not been shown. However, this does not affected the clarity of the present invention.

Figure 3:
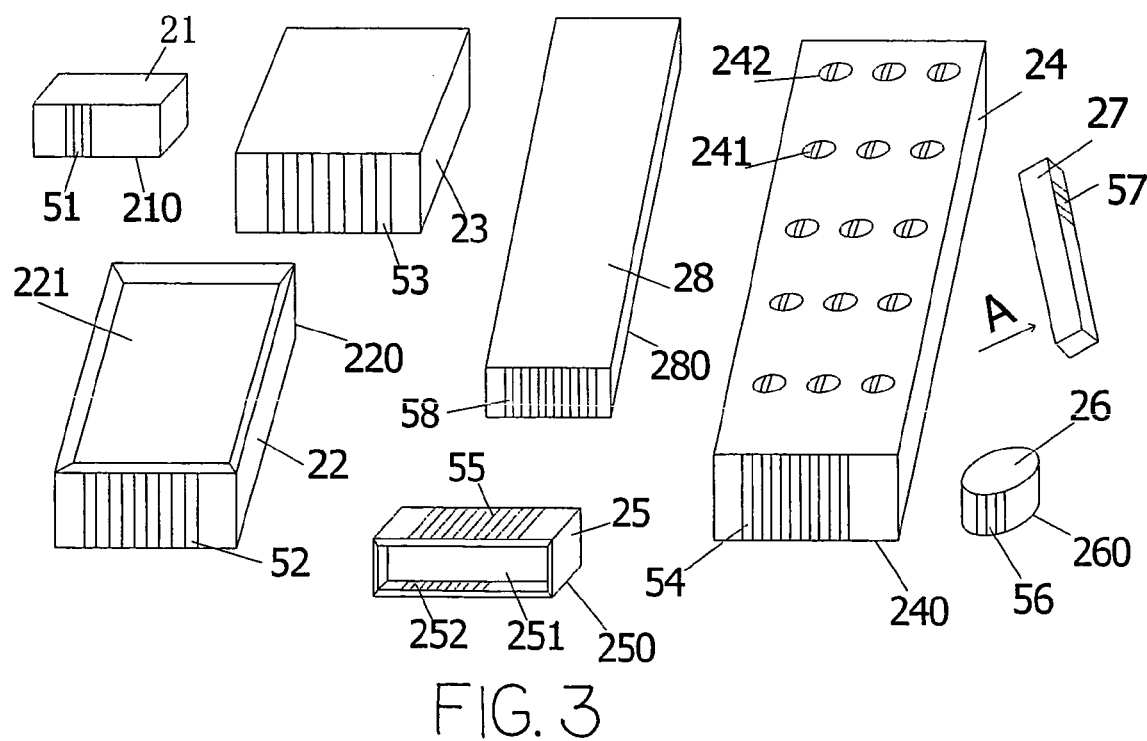
FIG. 3 is a perspective view of the functional modules of the assembling electronic device according to the above preferred embodiment of the present invention.

FIG. 3 illustrates the functional modules 21-28, wherein the display 221 of the display module 22 is received in the respective module housing 220. As shown in the figure, the display window of the display 221 is directly exposed. Obviously, a transparent protecting cover can also be provided by the module housing 220.

Furthermore, on the module housing 240 of the main key-in module 24 has a plurality of main key-in base holes 242, wherein a main key-in base 241 protrudes from the module housing 240, corresponding to the main key of the main keypad of the external casing member.

Also, the external port module 25 has a connecting port cavity 251, wherein an input/output connecting port is provided therewithin, provided for connecting to the connecting device of external elements. The module housing 250 of the external port module 25 is provided for protecting the resilient metal connecting piece of the frequently used input/output connecting port 252 in the connecting port cavity 251. The module housing 250 of the external port module 25 can of course also protect other internal parts of the internal circuitry, such as the connection signal processing circuit.

On the other hand, if the external port module 25 only comprises one input/output connecting port 252, and if the processing of connection signal is handled by the main control module 23, the external port module 25 can then be simplified to an external port member and directly integrated on the characterized casing 1, as described below in the third embodiment of the present invention.

Naturally, under such circumstances, if the very simple and limited in function external port member is designed as a free-to-change functional module, then the module housing 250 of the external port module 25 can directly be provided by the plastic exterior of the external port member, so as to lower the production cost.

FIG. 5 is a sectional view of the auxiliary key-in module 27 as one of the functional modules, wherein a plurality of auxiliary key pad holes 272 are defined on the module housing 270 of the auxiliary key-in module 27 allowing the auxiliary key pad 271 protrudes therefrom, so as to correspond to the auxiliary key of the external casing member. Of course, since there are not that many auxiliary keys, if the auxiliary keys are directly provided in the module housing 270 of the auxiliary key-in module 27 or formed on the module housing 270 of the auxiliary key-in module 27, then, the auxiliary key is not required on the external casing member.

FIG. 6 illustrates the terminal circuit formed on the characterized casing 1 to electrically connect with the functional module, wherein the terminal circuit can be an electric or optical circuit linking device. The dashed lines represent the receiving cavity 18 corresponding to the power supply module at the rear of the characterized casing 1. The terminal circuit is represented by shaded lines, wherein the terminal circuit, which is integrally formed in the interior of the characterized casing 1, has a plurality of terminal ends integrally provided at the receiving cavities 11-18 respectively such that when the functional modules 21-28 fit in the receiving cavities 11-18, the terminals 51-58 of the functional modules 21-28 are electrically connected to the terminal ends of the terminal circuit respectively. In other words, the terminal circuit can be an optical connection to the display module 22 as one of the functional modules such that the optical signal therefrom is adapted to transmit to the other functional module 21, 23-28 to communicate with each other. Therefore, through the terminal circuit, the functional modules 21-28 are electrically connected with each other to form the complete circuit, so as to enable this embodiment of the present invention.

Obviously, the routing distribution of the terminal circuit is not necessarily the best, and can be modified during actual design and production.

Combining FIGS. 1 to 6, as well as the above description, it can easily be seen that in the present embodiment, by changing to different characterized casing 1, the objective of changing shape freely is achieved. On the other hand, by simply replacing the functional module that requires upgrading, for example, main control module, the objective of self upgrading of functions can be achieved. Also, these two processes are conveniently carried out, and will not damage the internal elements of the functional modules protected by the module housing, providing a better realization of the objective of the present invention.

According to the present embodiment of the present invention, the hardware and software of the main controller electric circuit can be separated into two functional modules, such that the software portion of the main controller electric circuit can be independently upgraded without altering the hardware of the main controller electric circuit, increasing the flexibility of the present embodiment of the present invention.

Furthermore, users can also independently upgrade other functional modules, such as the display module, so as to improve the display performance. In actual application, the designers only need to understand the idea of the present invention. The division of functional modules wholly depends on the necessity.

The appearance and features of the characterized casing 1 and the functional modules can also be freely designed. Such designs are well known in the art, such as a first connecting device formed as the resilient connecting piece provided on the functional module is engaged with a corresponding groove provided on respective receiving cavity so as to hold the functional module within the respective receiving cavity in position. The detachable face is detachably mounted to the casing body by means of screws or can also be other more suitable structures as chosen by the designer.

Furthermore, each of the module housings of the functional modules 21-28 is shaped and sized corresponding to the respective receiving cavity 11-18 such that when the module housings are fittingly disposed in the receiving cavities 11-18, the functional modules 21-28 are securely held in the characterized casing 1 in position. In order to ensure the position of each of the functional modules 21-28, a holding wall is formed on the characterized casing 1 to surround each of the receiving cavities 11-18 such that when the functional module 21-28 is received in the respective receiving cavity 11-18, the holding wall encircles the module housing of the functional module 21-28 so to firmly hold the functional module 21-28 in position. Likewise, the receiving cavities 11-18 are spacedly indent on the characterized casing 1 for the functional modules 21-28 to be fitted therein.

FIGS. 7 to 11 illustrate an alternative mode of the characterized casing 1, wherein the characterized casing 1 of the assembling electronic device is embodies as a flip-type mobile phone.

Referring to FIG. 7 to FIG. 9, the characterized casing 1 comprises an audio output module receiving cavity 11, a display module receiving cavity 12, a main control module receiving cavity 13, a main key pad module receiving cavity 14, an external port module receiving cavity 15, an audio receiving module receiving cavity 16, an auxiliary key pad module receiving cavity 17, a power supply module receiving cavity 18, an image recorder module receiving cavity 19, and a folding joint 101 for realizing the foldable feature of the characterized casing 1. Accordingly, the characterized casing 1 is constructed to have a base body and a cover body pivotally connected thereto via the folding joint 101 such that the characterized casing 1 is adapted to be folded into a compact unit by pivotally flipping the cover body to overlap on the base body. It is worth to mention that the receiving cavities 11-18 are provided in the base body and the cover body such that the display module 22 is received in the display module receiving cavity 12 within the cover body while the main key-in module 24 is received in the main key pad module receiving cavity 14 within the base body.

Also, as shown by the figures, the display module receiving cavity 12, this embodiment of the present invention is a foldable wireless mobile phone with double displays. In other words, two displays are formed at an inner side and an outer side of the cover body of the characterized casing 1.

FIGS. 10 and 11 illustrate the structure of the display module and the image recording module of the functional modules, wherein the display module 22 comprises a module housing 220, a first display 221, a second display 222, and a corresponding terminal 52. Similar to the first embodiment of the present invention, each of the first display 221 and the second display 222 also comprise a transparent protecting cover respectively, wherein the transparent protecting covers are also provided by the module housing 220 of the display module 22. The image recording module 29 only comprises a module housing 290, an image recorder 291 received therein, and a corresponding terminal 59. The internal circuitry for converting an optical signal of the image recording to an electrical signal has not been shown in the figure. Also, the internal configuration of the internal circuitry with the terminal 59 has not been shown. However, this should also not affect the clarity of the present invention. Since the structures of other functional modules are similar to the first embodiment of the present invention, they will not be illustrated here.

It is worth mentioning that the image recording module 29 comprises the image recorder 291 received in the module housing 290 for protecting the image recorder 291, and the terminal 59 communicatively connected with the image recorder 291, the terminal 59 thereof is designed to connect with the other functional modules that the optical signal can effectively be transmitted from the image recorder 291 and is converted into electrical signal to the corresponding functional module.

Of course, the function of converting the optical signal into electrical signal can also be completed by the terminal 59 of the corresponding functional module, the terminal circuit, or by other corresponding electric or optical connecting device provided on the corresponding receiving cavity. It is believed that people skilled in this art can easily and comprehend these features. Accordingly, the terminal circuit should be designed as optical fiber bundle or similar optical signal transmitter for optical transmission.

Figure 12:
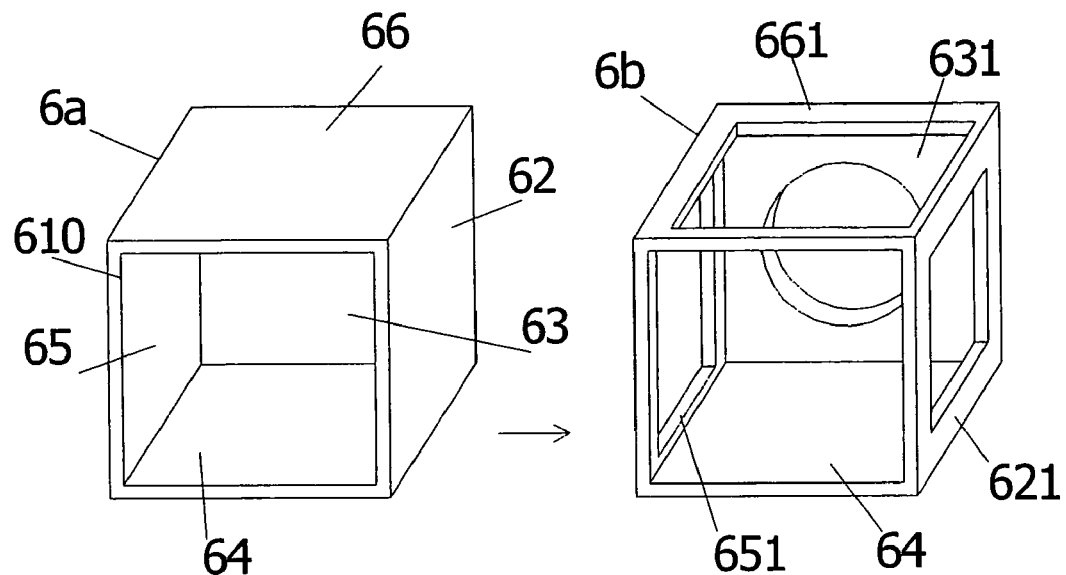
FIG. 12 illustrates the receiving cavity of the characterized casing according to the above preferred embodiment of the present invention.

Referring to FIG. 12, the receiving cavity of the present invention is illustrated. Gathering from the figures regarding the above embodiment, a receiving cavity generally has the structure of the receiving cavity 6a as shown in the figure, such that apart from providing a functional module opening 610, all other sides are bounding surfaces 62, 63, 64, 65, 66.

In reality, it should be pointed out that the receiving cavity of the present invention does not necessarily be in this format. As shown by the receiving cavity 6a in FIG. 12, it can totally be changed to be the receiving cavity 6b of the right hand side Figure, wherein the bounding surfaces 62, 63, 64, 65, 66 are completely simplified as bounding and positioning pieces 621, 631, 641, 651, 661. Obviously, as long as the corresponding functional module can be fixed in position and contained by the predetermined space, the bounding and positioning pieces 621, 631, 641, 651, 661, as shown in the figure can further be simplified. Also, if combined with the positioning fixing device, then the receiving cavity can only have four or less bounding and positioning pieces. This is obvious to people skilled in the art.

Figure 13:
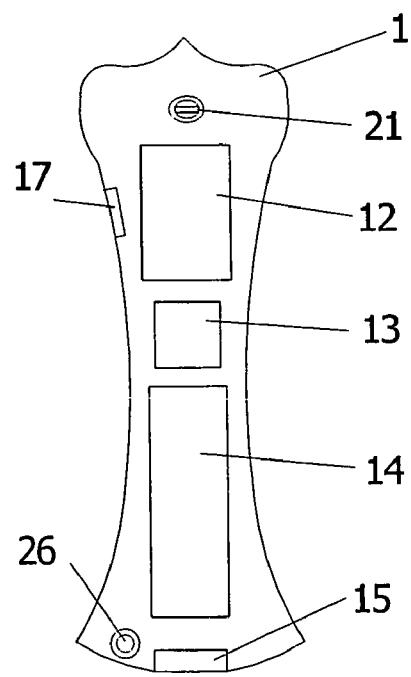
FIG. 13 illustrates an auxiliary functional module incorporating with the characterized casing according to the above preferred embodiment of the present invention.

Referring to FIG. 13, another alternative of the characterized casing 1 is illustrated, wherein a front view of the characterized casing 1 allowing a free changing of appearance and self functional upgrade of a wireless mobile phone, comprises an audio receiver module 26 and an audio frequency output function member 21 is illustrated. As shown in the figure, the audio receiver module 26, namely, a receiver member, and the audio frequency output function member 21, namely, the listening member, are integrated on the characterized casing 1, such that the self upgradeable functional module does not include these two functional modules.

In reality, other auxiliary functional modules, such as an input/output functional module 25, can also be simplified to functional modules having standardized connecting ports integrated on the characterized casing 1. As a result, such functional modules, which do not require any upgrading, can be permanently built-in with the characterized casing 1 at a predetermined position while the terminal circuit is pre-wired to connect with such functional modules. In other words, the auxiliary functional module can also be integrated with the characterized casing 1 at a corresponding position, such as the audio receiving module can be integrated with the base body of the flip-type mobile phone, such that the auxiliary functional module can be directly connected to the main control module 23 when the main control module 23 is received in the respective receiving cavity 13 in the characterized casing 1. Therefore, the auxiliary functional module as a standard functional module permanently built-in with said characterized casing at a predetermined position to electrically the terminal circuit such that the auxiliary functional module is electrically connected to the functional modules through the terminal circuit when the functional modules are replaceably mounted in the characterized casing 1.

Of course, in actual production, consumers' preference and the market and product strategy of the manufacturer determine which auxiliary or basic functional module element requiring no upgrading will be integrated onto the characterized casing 1, which is more difficult to detach.

It is worth mentioning that, referring to the above three embodiments, slots in wireless mobile phone for SIM cards, or cards of the like, has not been shown. In reality, such slots can be provided on the main control functional module or on the external port module. It can also be provided on other suitable functional module, or even on a suitable position on the characterized casing 1. As long as it is convenient for the user to plug and unplug, any suitable design is acceptable.

Furthermore, according to the above embodiment, the characterized casing 1 can constructed as other aesthetic design wherein the cover body is rotatably mounted to the base body via a rotating joint. As the art of the structure of such member is well known, it will not be detailed here. Of course, the characterized casing 1 of the present invention can also be of any form known in the art, such as slidable structure.

In addition, according to the above embodiments, the shape of the characterized casing 1 seems to have special features, such as a graceful aerodynamic. In reality, the characterized casing 1 can also be one that has no special feature, such as a structure with a more rigid frame, and all special features are on the external casing member. But regardless, the shaping structure of the characterized casing 1 has to provide a support to the overall design.

Finally, it should be pointed out that despite only three embodiments are provided here, and all are about wireless mobile phone, as long as the essence of the present invention is understood, it can be flexibly apply to other portable electronic devices.

Figure 15:
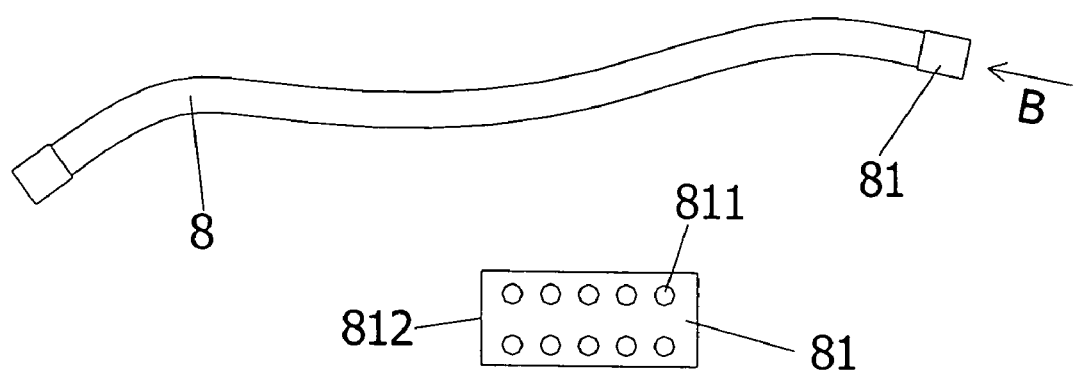
FIG. 15 is a perspective view of the signal cable of the terminal circuit according to the above embodiment of the present invention.

As shown in FIG. 15, the terminal circuit comprises at least a signal cable 8 having a plurality of connectors 81 extended to the receiving cavities 11-18, wherein each of the connectors 81 has a connector body 812 and a plurality of connecting pins 811 spacedly extended therefrom. Accordingly, the terminal of each of the functional modules is embodied as a cable connector corresponding to the connectors 81 of the signal cable 8 such that the connectors 81 of the signal cable 8 are respectively connected to the terminals of the functional modules to electrically connect the functional modules with each other. It is worth to mention that the signal cable 8 can be an optical signal transmitting cable adapted to transmit the optical signal between the functional modules to optically link the functional modules together. Likewise, the signal cable 8 can be an electric transmitting cable to electrically connect between the functional modules as the complete circuit.

Figure 16:
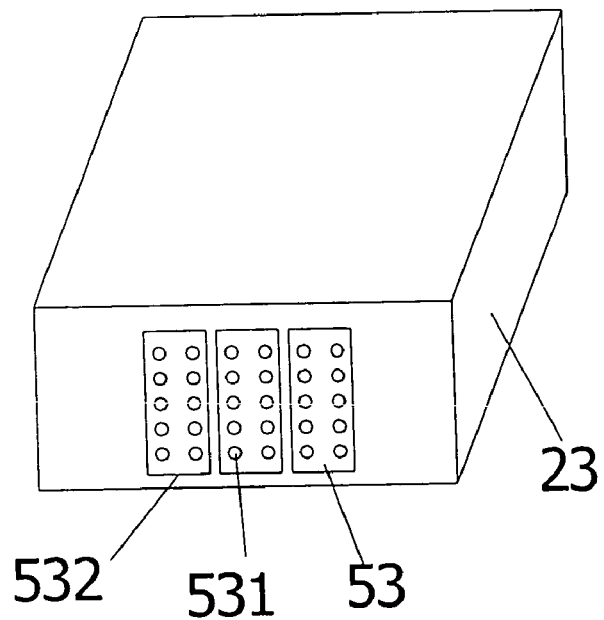
FIG. 16 illustrates the terminal of the functional module according to the above embodiment of the present invention.

As an example, according to the main control module 23 as shown in FIG. 16, a plurality of cable connectors 532 of the terminal 53 are provided on the module housing of the main control module 23, wherein each of the cable connectors 532 has a plurality of connecting grooves 531 such that the connecting pins 811 are fittingly inserted into the connecting grooves 531 respectively so as to connect the signal cable 8 with the main control module 23.

Figure 14:
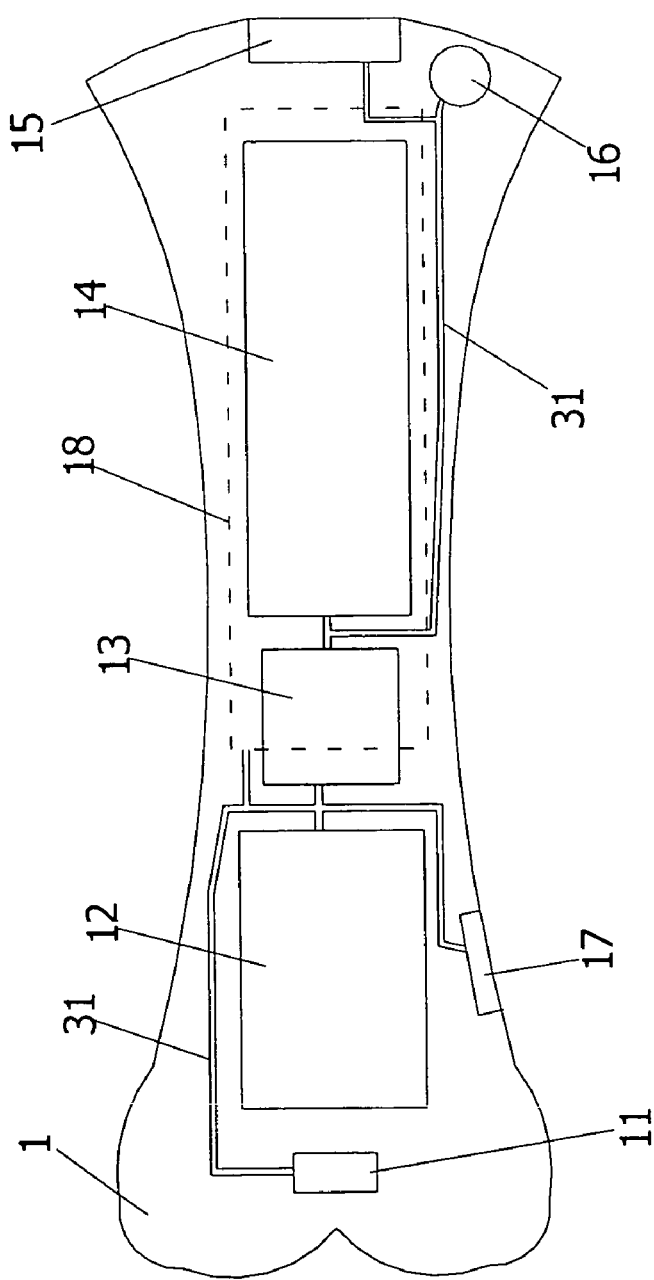
FIG. 14 is a sectional view of the characterized casing according to the above preferred embodiment of the present invention, illustrating the guiding groove being formed on the characterized casing.

As shown in FIG. 14, the characterized casing 1 further has a guiding groove 31 formed thereon wherein the signal cable 8 is received in the guiding groove 31 after the signal cable 8 is electrically connected with the functional modules. Therefore, the signal cable 8 is held along the guiding groove 31 to prevent the signal cable 8 from intertwining within the characterized casing 1.

It is well known that as the rapid advance in microelectronic technologies, the physical volume of electronic elements and electro-optics elements are getting smaller and smaller, providing a good support for the basics of the present invention. It is not difficult to understand that the functional module is capable of being made smaller and in a standardized size.

As ergonomics has to be taken into consideration, the assembling electronic device of the present invention cannot be made too small. Hence, the characterized casing 1 and the corresponding can be freely designed, according to the suitable size and volume, and the ergonomics of the human body, as long as there are shaping cavities that correspond to each of the functional modules.

Similarly, corresponding to the standardizing of the sizes of the functional modules, the sizes of the receiving cavities can also be standardized. And as the electric or optical circuit linking device can be completely embedded in the characterized casing 1, it only requires the terminal circuit to connect with the functional modules. It is obvious that the signal cable of the terminal circuit can be designed by referring to the standardization module of the main computer ports and connections.

Hence, after purchasing the assembling electronic device, the functions of the electronic device is wholly determined by the relatively standardized functional module. The characteristics of the shape and appearance of the electronic device is determined by the shapes of the different relatively independent characterized casing 1 (the receiving cavity and the terminal circuit of which maintains the same standardization as its corresponding functional module, and the basic elements of the terminal circuit such as wiring, circuit distributions and circuit quantities can also be relatively standardized) and its corresponding functional module. Hence, by purchasing characterized casings 1 of different shapes, the users can easily realize the fun of self-assembly.

Obviously, the present invention is compatible with the outer casing changeable feature of existing portable electronic devices (such as wireless mobile phone), simply by providing different external casing elements that correspond to the shape of the characterized casing 1. Also, upgrading of the functions of the electronic device can easily, conveniently and economically be achieved by replacing the corresponding functional module.

With respect to existing technology, the present invention widely expands the flexibility of modifying the shapes and appearance of portable electronic devices. It can be imagined that, by utilizing the present invention, users can modify the shape and appearance of their favorite electronic devices, to satisfy their interests in personalizing and to match with their outfit, personal image and mood, and provide personalized accessories. Furthermore, the present invention provides a flexible, effective, convenient and economical solution to functional upgrade of electronic devices, providing a deep influence on design and development of electronic devices.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An assembling electronic device, comprising:
   a plurality of functional modules, wherein each of said functional modules has a terminal;
   a characterized casing having a plurality of receiving cavities, wherein each of said functional modules is shaped and sized to detachably receive in said respective receiving cavity so as to securely retain said functional module in said characterized casing in position; and
   a terminal circuit provided at said characterized casing to electrically connect with said terminals of said functional modules when said functional modules are detachably received in said receiving cavities respectively so as to form a complete circuit for said functional modules, such that each of said functional modules is replaceably mounted in said characterized casing for enhancing a user-personalizability, wherein said terminal circuit comprises at least a signal cable having a plurality of connectors extended to said receiving cavities respectively, wherein said connectors of said signal cable is electrically plugged into said terminals of said functional modules respectively to electrically connect said functional modules with each other, wherein said characterized casing further has a guiding groove formed thereon, wherein said signal cable is received in said guiding groove after said signal cable is electrically connected with said functional modules, such that said signal cable is held along said guiding groove to prevent said signal cable from intertwining within said characterized casing.

2. An assembling electronic device, comprising:
   a plurality of functional modules, wherein each of said functional modules has a terminal;
   a characterized casing having a plurality of receiving cavities, wherein each of said functional modules is shaped and sized to detachably receive in said respective receiving cavity so as to securely retain said functional module in said characterized casing in position; and
   a terminal circuit provided at said characterized casing to electrically connect with said terminals of said functional modules when said functional modules are detachably received in said receiving cavities respectively so as to form a complete circuit for said functional modules, such that each of said functional modules is replaceably mounted in said characterized casing for enhancing a user-personalizability, wherein each of said functional modules comprises a module housing and an internal circuitry received therein, wherein said terminal is provided at said module housing to electrically connect with said internal circuitry such that when said complete circuit is formed, said internal circuitries of said functional modules are electrically connected with each other through said terminal circuit, wherein each of said module housings is shaped and sized corresponding to said respective receiving cavity such that when said module housings are fittingly disposed in said receiving cavities, said functional modules are securely held in said characterized casing in position, wherein said terminal circuit comprises at least a signal cable having a plurality of connectors extended to said receiving cavities respectively, wherein said connectors of said signal cable is electrically plugged into said terminals of said functional modules respectively to electrically connect said functional modules with each other, wherein said characterized casing further has a guiding groove formed thereon, wherein said signal cable is received in said guiding groove after said signal cable is electrically connected with said functional modules, such that said signal cable is held along said guiding groove to prevent said signal cable from intertwining within said characterized casing.

3. The assembling electronic device, as recited in claim 2, wherein said characterized casing comprises an elongated casing body defining said receiving cavities aligned therewithin, wherein each of said functional modules, which is an upgradeable module, is replaceably mounted in said casing body to form said assembling electronic device.

* * * * *